United States Patent

Allagnat et al.

[11] Patent Number: 5,176,949
[45] Date of Patent: Jan. 5, 1993

[54] TEXTILE REINFORCEMENTS FOR COMPOSITE MATERIALS AND METHOD OF MANUFACTURING THEREOF

[75] Inventors: Pierre Allagnat, La Verpilliere; Jean-Paul Charles, Saint Genis Laval; Michel Delehaye, Caluire, all of France

[73] Assignee: Brochier S.A., Decines Cedex, France

[21] Appl. No.: 499,498

[22] PCT Filed: Oct. 27, 1989

[86] PCT No.: PCT/FR89/00564

§ 371 Date: Aug. 20, 1990

§ 102(e) Date: Aug. 20, 1990

[87] PCT Pub. No.: WO90/04507

PCT Pub. Date: May 3, 1990

[30] Foreign Application Priority Data

Oct. 28, 1988 [FR] France .................................. 88 14189

[51] Int. Cl.⁵ .................................................. B32B 27/14
[52] U.S. Cl. ........................................ 428/198; 156/290; 428/195; 428/283; 428/323; 428/327; 428/355; 428/413; 428/902; 428/240
[58] Field of Search ............... 428/195, 198, 402, 283, 428/355, 902, 413, 323, 327, 240; 156/290

[56] References Cited

U.S. PATENT DOCUMENTS

| | | | |
|---|---|---|---|
| 4,139,613 | 2/1979 | Hefele | 427/197 |
| 4,410,385 | 10/1983 | Murphy et al. | 156/181 |
| 4,741,873 | 5/1988 | Fischer et al. | 264/25 |
| 4,874,655 | 10/1989 | Groshens | 428/198 |

FOREIGN PATENT DOCUMENTS

| | | |
|---|---|---|
| 0189351 | 7/1986 | European Pat. Off. |
| 8703947 | 9/1987 | Fed. Rep. of Germany |
| 2241604 | 3/1975 | France |
| 0275722 | 11/1987 | France |
| 908217 | 10/1962 | United Kingdom |

Primary Examiner—James J. Bell
Attorney, Agent, or Firm—Wenderoth, Lind & Ponack

[57] ABSTRACT

From 3 to 25 g/m², in particular from 5 to 10 g/m² of a pulverulent reactive hot-melt composition including a prepolymer and a hardener for the latter are applied onto one or two faces of textile reinforcement. The hardener becomes active only at a temperature above that at which the powder softens to become tacky. This powder on one or two faces makes it possible in particular to preform the reinforcement before it is employed for the manufacture of an article made of composite material.

14 Claims, 2 Drawing Sheets

TEXTILE REINFORCEMENTS FOR COMPOSITE MATERIALS AND METHOD OF MANUFACTURING THEREOF

BACKGROUND OF THE INVENTION

The invention relates to the field of textile reinforcements for composite materials.

It is now well known to manufacture composite materials of high strength, despite their low weight, by coupling a matrix, generally a heat-curable resin with a set of textile structures, such as tissues. There are various methods for obtaining such materials. Reinforcing tissues can be impregnated with the resin manually, to be subsequently subjected to a contact molding method. A method which is employed, industrially consists of placing the textile reinforcement in a mold into which the resin is introduced and, to facilitate the flow of the latter, creating a pressure gradient in the mold to permit an optimum resin transfer. Another widely employed method consists of compressing a stack of textile reinforcements in a mold into which resin has been introduced.

In yet another method, a resin film or sheet is transferred under the effect of heat and pressure onto a stack of tissues or a multidimensional textile structure with fiber orientation. A further method also consists of passing the reinforcement, after impregnation with a resin, through a heated die to produce continuous profiled articles by extrusion. All these processes for the manufacture of articles made of composite materials are well known to the specialist and therefore do not need to be described in greater detail.

In practice, the cutting, handling and assembling of a number of layers and the forming of dry, that is to say not preimpregnated, textile structures frequently present problems and limit the possibilities of automation of the operations for the manufacture of articles made of composite materials, especially according to the methods referred to above.

In particular, the placing of dry reinforcements on a mold of complex shapes is a problem which has not been properly resolved, most especially in the case of stacking of a number of layers and when attempts are made to conform to the precise fiber orientations and to produce variable thicknesses, in order to obtain high mechanical performances.

SUMMARY OF THE INVENTION

An object of the present invention is to provide a solution to the technical problems just mentioned. This object is achieved by providing a textile reinforcement for forming a composite material, characterized in that, at least one of its faces comprises a powder applied thereto, in at least point-fashion, in an amount of 3 to 25 $g/m^2$ and in particular of 5 to 10 $g/m^2$, and the powder being torate of a pulverulent composition comprising a prepolymer and a hardener for the latter, the composition being chosen so as to be compatible with the matrix of the composite material to be manufactured.

The object of the invention is also achieved by a process consisting of applying to at least one face of the textile reinforcement from 3 to 25 $g/m^2$, in particular composition comprising a prepolymer and a hardener for the latter, the hardener becoming active only at a temperature above that at which the powder softens to become tacky, and the composition being chosen so as to be compatible with the matrix of the composite material to be manufactured.

It is already known (see for example GB-A-908,217 and EP-A-0,275,722) to distribute fusible components onto a support tissue, for example in the form of nodules of resin which are applied and softened by heating on one face of the tissue and adhere thereto after cooling. These are, hot-melt products, which are intended to be bonded by heat in clothing applications. Means are proposed for preventing the hot-melt substance from passing through the support.

Such articles are completely foreign to the field of the present invention, which relates to textile reinforcements for composite materials, which may be advantageously preformed to correspond to the desired shape of the reinforcement. The pulverulent hot-melt composition must be compatible with the matrix of the composite material to be manufactured. It is of no importance that such a composition passes through the textile structure of the reinforcement.

Within the meaning of the present invention, the expression textile reinforcement refers to any structure comprising fibers which are usually employed in the manufacture of composite materials. Tissues are generally involved, but it is also possible to employ nonwovens in the form of sheets. These are generally uni- or bidirectional structures; but nothing prevents the invention from being applied to multidirectional structures, which, are well known in the technology of manufacturing reinforcements for composite materials.

The invention can be applied to textile reinforcements comprising fibers of any kind, natural or artificial, but preference is given to technical fibers, which are widely employed in composite materials, such as glass, carbon, boron, silicon, silicon carbide, aramid fibers and other technical fibers, by themselves or mixed.

The means provided by the invention for treating textile reinforcements consists essentially of powdering one or two faces of the reinforcement in question. To this end, a determined and small quantity of a pulverulent composition is applied to one or two faces of the reinforcement and is distributed over the treated face(s) without, however, covering the whole of the latter.

The invention permits an assembly and a shaping of the dry textile reinforcements prior to their introduction into the mold, with the formation of semirigid "preforms" which are easy to handle, which can be cut rapidly, for example in the form of a stack, and which can be readily adapted to automatic processes. Furthermore, the solution adopted by the invention does not perturb the flow of the resin into the textile reinforcement, and therefore does not increase the length of this stage of the manufacturing process. In the production of high-performance composite materials, the invention does not entail any lowering of the thermomechanical properties and of the chemical resistance of the manufactured articles. Equally, by maintaining the position of the reinforcement fibers, the invention contributes to a better reproducibility of mechanical properties and facilitates the production of articles which must have a good surface quality. The invention further makes it possible to produce articles which need no machining of their periphery after molding.

The reactive pulverulent hot-melt composition essentially comprises a prepolymer and a hardener for the latter. Many prepolymer-hardener systems which are accessible to the specialist are in existence, the only condition to be fulfilled being that the hardener should become active only at a temperature above that at which the pulverulent composition softens and becomes tacky. This condition must be fulfilled even if the softening temperature is reached a number of times: the adhesiveness of the composition can thus be exploited several times over, the composition being then of the "reactivatable" type. It is also important that the prepolymer of the pulverulent composition should be chosen so as to be compatible with the matrix of the composite material to be subsequently manufactured. For this reason, preference is often given to epoxide prepolymers, because of the advantageous properties possessed by the epoxide matrices of the composite materials. It has been found that the use of the treated textile reinforcements in accordance with the invention with a powdering of epoxide prepolymer and which can be employed in composite materials with an epoxide matrix, would not entail any change in the mechanical properties at room temperature, on heating, and after wet aging. No change in the flow conditions of the matrix is recorded during the processing and the molding. Finally, in the case of the final manufacture of the composite material, the polymerization cycle is practically unchanged when compared with the use of resins which cure when heated.

An example of a reactive pulverulent hot-melt composition of a epoxide prepolymer-hardener type, satisfying the needs of the invention, consists of a polycondensate of epichlorohydrin and of bisphenol A with an acid anhydride hardener, these being mixed and ground to a particle size from approximately 80 μm to approximately 100 μm for the most part.

A particular composition of this type is characterized especially by:
 its rheological properties before crosslinking, namely:
  a tenacious viscosity between 70° and 90° C.
  a very high fluidity between 130° and 140° C.
 its curing conditions, namely:
  a minimum curing time of 24 hours for a minimum temperature of 120° C. or a minimum curing time of 80 minutes for a minimum temperature of 170° C.
 its rheological properties after crosslinking, namely:
  a tensile shear strength of 32 MPa at room temperature,
  a tensile shear strength of 17 MPa at 100° C.

The mass of the pulverulent composition is deposited onto at least one face of the textile reinforcement in an ariant within the range of 3 to 25 g/m² and preferably from 5 to 10 g/m². A point-fashion powdering is thus obtained by virtue of the choice of the conditions for applying the powder and of the particle size of the latter. This particle size must, in fact, produce adhesive bonding points of a sufficient strength despite a fairly loose distribution at the surface of the reinforcement, so as not to perturb the flow of the resin used as a matrix during the subsequent manufacture of the composite material. As a general rule, the particle size of the prepolymer-hardener composition can range from 20° to 180 μm, advantageously approximately from 40 to 100 μm.

It also goes without saying that the reactive prepolymer-hardener hot-melt system will have to exhibit a softening temperature and a viscosity which are compatible with the methods of assembly and of a preforming of the textile reinforcements at low temperature and low pressure. In fact, the invention offers many advantages and is of much interest for assembling a number of textile reinforcements which have been treated by powdering. It is thus possible to produce directly stacks of reinforcements for composite materials. The assembly of a number of reinforcements can be produced in a known manner at relatively low temperatures, generally below 100° C., for example on the order of 80° C., and under reduced pressure, especially of 50 to 100 kPa. In the case of non-continuous forming, the hardware employed may consist of a heater plate placed under a membrane subjected to a pressure reduction, of a press or any other similar means; and in the case of continuous assembly, of rollers which provide pressure and heat, or any other similar means.

In the conditions just defined, the assembly can be carried out in a very short time, for example less than 1 minute, especially of the order of 30 seconds.

Similarly, a treated textile reinforcement in accordance with the invention can be preformed at a relatively low temperature, generally below 100° C., for example 80° C., and under reduced pressure, especially the order of 50 to 100 kPa, to a shape corresponding to that desired in the final composite material. In the case of non-continuous forming, the hardware employed may consist of a heated mold placed under a membrane subjected to a pressure reduction, of a press or of any other similar means; and in the case of continuous forming, of rollers which apply pressure and heat, or of any other similar means. As an alternative form, the temperature rise can be obtained using radiant heaters directing their heat onto the reinforcement, the pressure being obtained using a countermold or a vacuum bag.

In practice, the application of the pulverulent prepolymer-hardener composition onto one or two faces of the textile reinforcement can be performed using an emery-treated applicator roll or cylinder under which the textile reinforcement travels past, especially a tissue presented in the form of a tape. In this case, the particle size of the emery of the cylinder is adapted to that of the pulverulent composition, examples of which have been shown above. Also, the speed of travel and the temperature of application must be compatible with the reactivity threshold of the hardener. For example, in the case of an epoxide prepolymer-hardener system, good results have been obtained with application temperatures on the order of 100° to 140° C.

The textile reinforcements obtained in accordance with the invention are characterized in, that least one face of the reinforcement comprises a powder, in at least a point-fashion dispersement in an amount of 3 to 25 g/m² and in particular from 5 to 10 g/m², of a pulverulent composition comprising a prepolymer and a hardener for the latter.

As indicated above, these reinforcements may be preformed or otherwise.

The textile reinforcements treated according to the invention can be impregnated with resins of all kinds, but preference is given to high-performance heat-curable resins, such as polyepoxides and bismaleimides.

As mentioned above, such reinforcements may comprise any types of fibers or weaves. As is known, weaves are particularly useful for producing deformable tissues.

The reinforcements of the invention exhibit many advantages. In the form of individual components, the reinforcements are easier to cut and to handle than similar untreated reinforcements. It has also been seen that the powdering made it possible to assemble a number of reinforcements, and to preform them before their introduction into the mold for the manufacture of the composite material.

It has also been ascertained that the use of the reinforcements of the invention did not entail any inconvenience during the manufacture of the composite material. For example, in the case of resin transfer molding, no reduction was noted in the flow rates and the injected distances of resin. This advantageous behavior of the reinforcements of the invention will be illustrated in an example below.

The reinforcements treated in accordance with the invention can be handled and stored as such. The nature of the constituent powder permits an extended storage (at least 1 year) at a temperature below 30° C. in closed packaging in a moisture-free place. The reinforcements according to the invention can therefore be prepared in advance to be subsequently marketed.

BRIEF DESCRIPTION OF THE DRAWINGS

The invention will be illustrated further without being limited in any way by the description below, given with reference to the examples and to the attached drawings, in which.

DETAILED DESCRIPTION OF THE PREFERRED EMBODIMENTS

Figure 1:
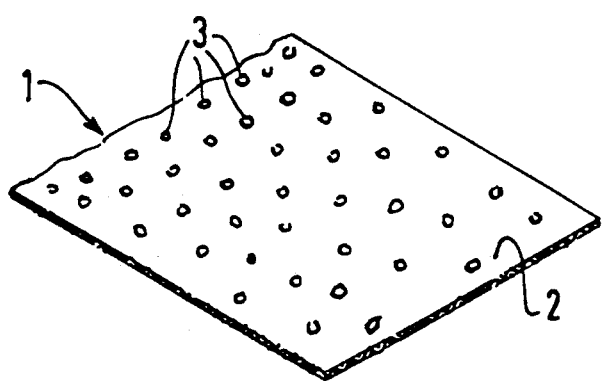
FIG. 1 is a schematic diagram, in perspective, of a reinforcing component according to the invention.

The reinforcement shown in FIG. 1 and indicated by reference 1 comprises, on at least one of its faces 2, a powdering 3, CONSTITUTING a reactive prepolymer-hardener hot-melt system. The drawing is merely a rough representation intended to illustrate that the powder is dispersed at random and exhibits a fairly loose distribution although, in practice, more uniform or a more closely spaced distribution is also possible.

Figure 2:
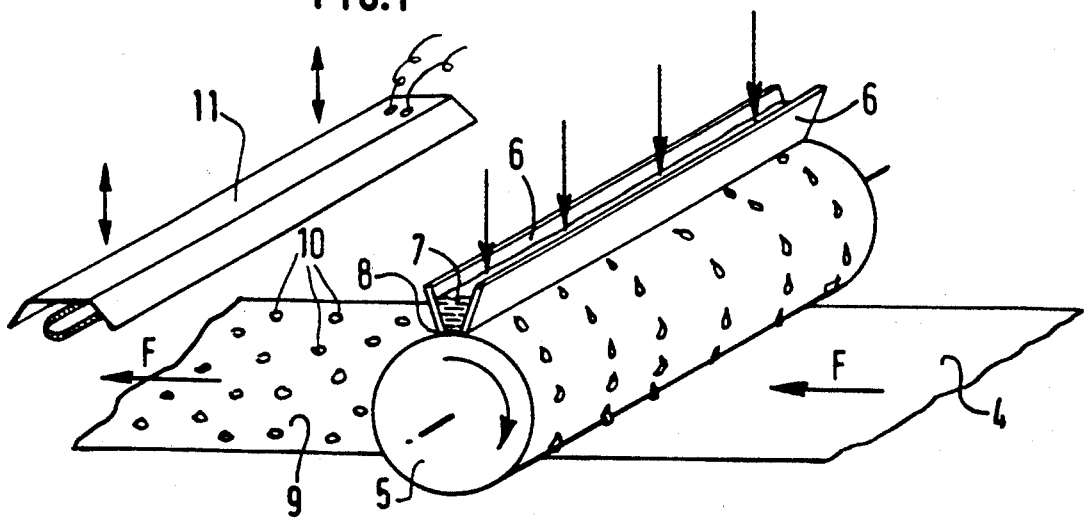
FIG. 2 is a schematic diagram of a device for continuously treating a reinforcement.

FIG. 2 shows diagrammatically a device for continuously manufacturing such a reinforcement.

The reinforcement to be treated, indicated by reference 4, is fed in the form of a strip in the direction of the arrow F. It runs under an applicator roll 5 which is dressed with emery cloth with a particle size similar to that of the powder and which, as it rotates, entrains the powder 7 held in a chute 6, the lower part 8 of which is cut away. The powder 7 thus entrained by the roll 5 is applied over the whole width of the reinforcement 4. The reinforcement coated with powder in this way then runs under an infrared rack 11 which softens the powder and fastens it to the surface 9 of the reinforcement in the form of points 10 constituting of the prepolymer-hardener system.

A reinforcement of the type shown in FIG. 1 can be employed in the manufacture of composite materials, either individually or after assembly with other similar reinforcements or else within a reinforcement which may also comprise other untreated textile structures. Also, the reinforcements according to the invention are particularly highly suitable for a preforming operation under the conditions shown above.

The examples below are used further to illustrate the invention without limiting it in any way.

EXAMPLE 1

A reinforcement tissue bearing the reference Brochier Injectex (R)G 900, GK carbon taffeta, was employed in the example.

A tissue of this kind has the following characteristics:

| Weave pattern: taffeta | |
|---|---|
| Nature of the yarn | |
| warp: | 6K carbon |
| weft: | 1) 6K carbon |
| | 2) polyester-covered 6K carbon |
| Mass per unit area | 295 ± 12 g/m$^2$ |
| Structure | |
| warp: | 37 ± 2.0 yarns/10 cm |
| weft: | 37 ± 2.0 yarns/10 cm (per 1 carbon stroke and 1 covered carbon stroke) |
| Thickness: | 0.33 ± 0.03 mm |

This tissue is a conventional taffeta whose injection characteristics have been improved by the introduction of a covered carbon yarn in 1 stroke out of 2 in the weft. With equipment of the type shown diagrammatically in FIG. 2, the following reactive pulverulent hot-melt composition was applied onto one face of the above-mentioned tissue, at a rate of 10 g/m$^2$: polycondensate of epichlorohydrin and of bisphenol A + acid anhydride hardener.

A strip of tissue was thus obtained, a sample of which is shown diagrammatically in FIG. 1.

To illustrate the usefulness of the invention, an assembly of seven layers of the tissue treated in this way was produced, the assembly being produced in a vacuum press (500 Pa of residual pressure) for 30 s at a temperature on the order of 80° C. For the purpose of comparison, a similar stack of seven layers of tissue, but not including the powder according to the invention, was also employed.

In both cases a 300×120×2 mm plaque of composite material was produced by resin transfer in a mold at 70° C. at a pressure of 100 kPa; the matrix employed consisted of an epoxy resin (product marketed by the Ciba Geigy Company under reference LY 564/HY 2954). After molding, the matrix was polymerized at 110° C. for one hour, after which the plaque was subjected to a postcure at 140° C. for two hours and then at 160° C. for 15 minutes.

The interlaminar shear strength "S" expressed in MPa of the plaques was measured according to IGC Standard 0426.230 225 on the plaques of composite for comparison on the plaques of composite. The results obtained, on the one hand with the plaque of composite material according to the prior art and, on the other hand, with the plaque of composite material of the invention are collated in Table I.

TABLE I

| | S at 20° C. | S at 100° C. |
|---|---|---|
| | BEFORE WET AGING | |
| Prior art | 53 | 34 |
| Invention | 53 | 34 |
| | AFTER WET AGING* | |
| Prior art | 50 | 26 |
| Invention | 50 | 26 |

*14 days in water at 70° C.

The results of Table 1 show that the values of the shear strength S are identical for both plaques before and after wet aging, both at 20° C. and at 100° C. These results clearly show that the mechanical properties of the composites obtained by molding reinforcements treated according to the invention are as good as those of the composites obtained by molding the usual reinforcements.

EXAMPLE 2

This example is intended to show that the use of the reinforcements according to the invention does not in any way perturb the conditions for obtaining the composite materials.

An assembly of three plies of reinforcement tissue identical with that employed in Example 1 was employed for this purpose, and was compared with stack of three plies of tissue not including any powder.

An article made of a composite material was manufactured by resin transfer in a mold under partial vacuum (500 Pa residual pressure) at a temperature of 70° C., the resin being the same as that employed in Example 1 (Ciba Geigy resin reference LY564/HY2954). The results were assessed by measuring the injection time of resin and the flow distance of the latter in the mold, which represent the transfer molding conditions, and it was found that the measured values were practically identical in both cases.

TABLE II

| Prior art | 1 min | 2 min | 3 min | 4 min |
|---|---|---|---|---|
| Distance (mm) | 310 | 470 | 600 | 700 |
| Invention | 1 min | 2 min | 3 min | 4 min |
| Distance (mm) | 300 | 460 | 580 | 670 |

It can therefore be seen that the conditions of manufacture of the composite materials are not altered when reinforcements treated in accordance with the invention are employed.

EXAMPLE 3

This example is intended to show the use of the reinforcements treated according to the invention for the manufacture of dry preforms. In this example a reinforcement tissue exhibiting the following characteristics was employed:

The weave pattern consists of a so-called 3X tissue comprising three weft sheets arranged parallel to each other and in the plane of the tissue, and six warp sheets which cross the weft sheets obliquely (at an angle close to 45°).

| | Nature of the yarn |
|---|---|
| warp: | 68 Tex × 2 multifilament glass |
| weft: | 68 Tex × 2 multifilament glass |
| Nominal mass per unit area: | 410 g/m² |
| | Nominal structure |
| warp: | 15 yarns/cm |
| weft: | 15 strokes/cm |
| Thickness: | 0.38 mm |

This tissue was treated with the same reactive pulverulent hot-melt composition and in the same way as in Example 1.

A stack of two layers of this tissue was heated to 80° C. for 30 s in an infrared oven and was then placed, using an automatic transfer system, under a fast-closing press which applied a pressure of 100 kPa by means of a mold in the shape of a 500×300 mm parallelepiped. The tissues were left in the closed mold for 40 s.

A preform sufficiently stiff to be easily handled and cut to an accurate contour was thus obtained in approximately 90 s. This preform can be stored for a number of months if necessary and can then can be introduced into an automated production cycle including an impregnation process following various processes, for example using resin transfer or using compression or using film transfer.

EXAMPLE 4

Figure 3:
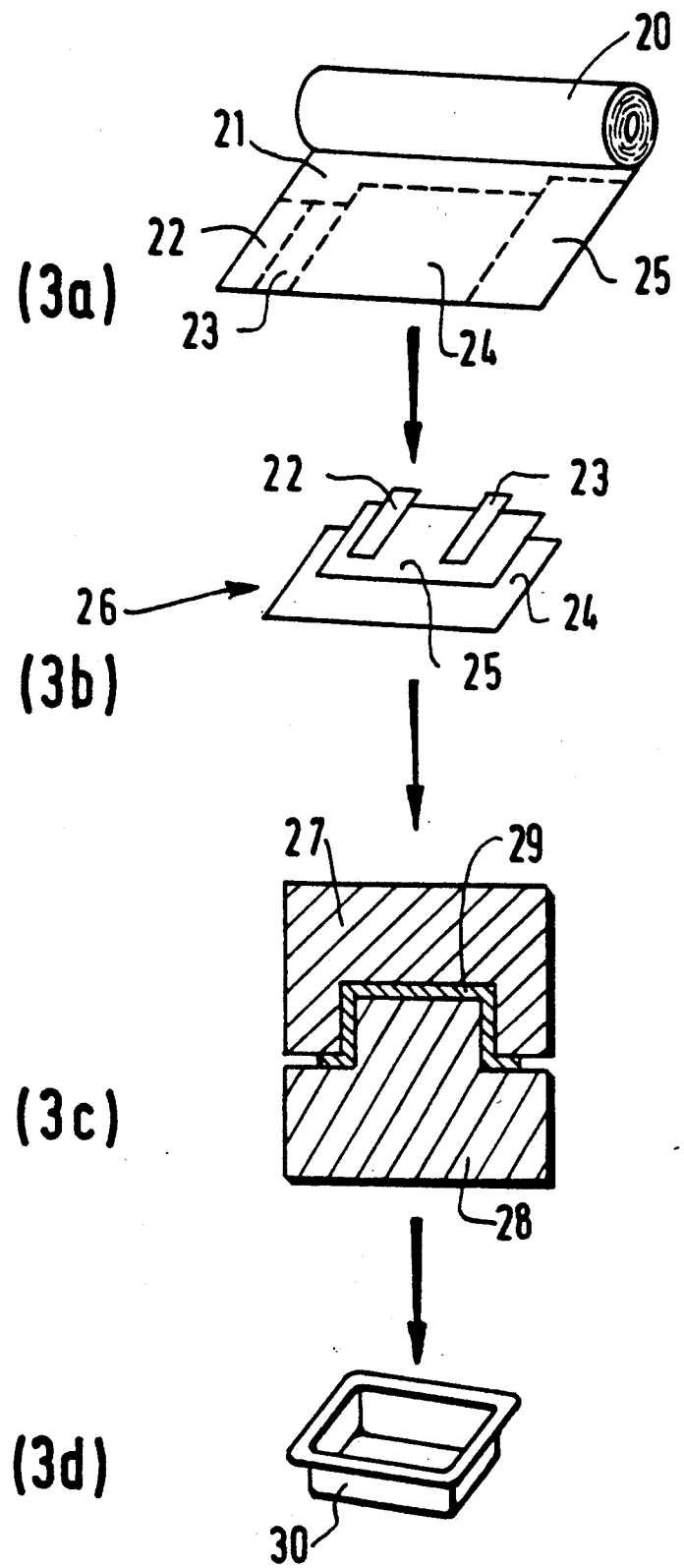
FIGS. 3(a)-(d) diagrammatically illustrates the stages of the production of a preform from the reinforcement of FIG. 1.

This example is intended to illustrate the ability to produce preforms with the aid of a reinforcement in accordance with the invention. The description which follows is given with reference to FIG. 3, which shows diagrammatically the stages of the manufacture of a preform which has the general configuration of a bowl with a rim in its upper part.

The reinforcement 21 is unwound from a roll 20. The stage illustrated of (3a) consists in cutting out of the reinforcement 21 a certain number of components 22, 23, 24 and 25 which, in the present case and for the sake of simplicity, are rectangular in shape.

The advantage provided by the invention is found already at this first stage, because the powdering treatment makes cutting easier by limiting the movements of fibers and permits automatic handling.

The next stage, illustrated in (3b), consists of stacking, as shown in the drawing, the various components originating from the cutting operation (3a). It is thus seen that the component 24 is placed in the lower part of the stack on a table (not shown) and then receives the component 25 and finally the two small strips 22 and 23. By virtue of the powder, the components are stacked and assembled up to a configuration which is generally planar, although comprising some thickness, depending on the number of reinforcement plies which are superposed.

To hold the components in place in the stack 26, the latter is run through an infrared oven (80°-100° C.), and this has the effect of fixing the constituent components before they are treated in the shaping stage (3c).

In stage (3c), the stack 26 of reinforcements of FIG. (3b) is formed into a shape 29 corresponding to that desired for the composite material. In the example illustrated, a mold made up of two parts 27, 28 has been shown, forming a press. Any another equipment capable of operating hot and of applying a pressure can also be employed, for example a heater plate with a membrane to which a vacuum is applied or an inflatable bladder. The stack of reinforcements is then compacted, for example at 80° C. under 50 kPa.

A bowl-shaped preform 30 is thus obtained, such as shown in (3d), in which the edges can be subjected to a preliminary conventional deflashing operation. The preforms 30 can be stored before being employed in an operation of the manufacture of composite materials by molding. Furthermore, they can be easily handled and stacked. The trimming thereof can also be carried out in series on the stack thus obtained.

The bowl-shaped preform 30 includes corners, defined by trihedral portions thereof which can be obtained more easily by virtue of the use of the reinforcements of the invention.

The invention is not limited in any way by the above examples, which have been given merely by way of illustration. In fact, the reinforcements of the invention lend themselves to the manufacture of all kinds of preforms and of composite materials, according to the shapes and configurations of the articles to be produced.

We claim:

1. A textile reinforcement for use in forming a composite material, said textile reinforcement comprising: a sheet of reinforcement material having opposite surfaces, and a pulverulent hog-melt composition distributed over at least one of the surfaces of said sheet of reinforcement material as points of powder in an amount of 3 to 25 g/m², said composition comprising a prepolymer and a hardener for the prepolymer, said hardener becoming active only at a temperature above that at which said hot-melt composition softens and becomes tacky.

2. The textile reinforcement according to claim 1, wherein said sheet of reinforcement material is a unidirectional, bidirectional or multidirectional tissue or nonwoven.

3. The textile reinforcement according to claim 1, wherein said sheet of reinforcement material comprises technical fibers of at least one kind.

4. The textile reinforcement according to claim 1, wherein said prepolymer is an epoxide prepolymer.

5. The textile reinforcement according to claim 4, wherein said epoxide prepolymer is a polycondensate of epichlorohydrin and of bishphenol A, and the hardener is acid anhydride.

6. The textile reinforcement according to claim 1, wherein said pulverulent composition has a particle size from approximately 20 to 180 μm.

7. The textile reinforcement according to claim 1, having a non-planar shape.

8. The textile reinforcement according to claim 6, wherein said pulverulent composition has a particle size from approximately 40 to 100 μm.

9. The method for treating a sheet of textile reinforcing material for use in forming a composite material, said method comprising: providing a reactive hot-melt pulverulent composition of a prepolymer and a hardener for the prepolymer, the hardener becoming active only at a temperature above that at which the composition softens and becomes tacky; and applying said composition as points of powder to at least one of the surfaces of the sheet of textile material at a rate of 3 to 25 g/m².

10. A method according to claim 9, wherein the composition is applied to said sheet as points of powder at a rate of 5 to 10 g/m².

11. A method according to claim 9, wherein said providing a reactive hot-melt composition comprises mixing said prepolymer and said hardener and grinding the mixture to a particle size from approximately 20 to 180 μm.

12. A method according to claim 11, wherein the mixture is ground to a particle size from approximately 40 to 100 μm.

13. An assembly of textile reinforcements for use in forming a composite material, each of said textile reinforcements in the stack comprising a sheet of reinforcement material having opposite surfaces, and a pulverulent hot-melt composition distributed over at least one of the surfaces of said sheet of reinforcement material as points of powder in an amount of 3 to 25 g/m², said composition comprising a prepolymer and a hardener for the prepolymer, said hardener becoming active only at a temperature above that at which said hot-melt composition softens and becomes tacky.

14. An assembly of textile reinforcements for use in forming a composite material, at least one of said textile reinforcements comprising a sheet of reinforcement material having opposite surfaces, and a pulverulent hot-melt composition distributed over at least one of the surfaces of said sheet of reinforcement material as points of powder in an amount of 3 to 25 g/m², said composition comprising a prepolymer and a hardener for the prepolymer, said hardener becoming active only at a temperature above that at which said hot-melt composition softens and becomes tacky.

* * * * *

UNITED STATES PATENT AND TRADEMARK OFFICE
CERTIFICATE OF CORRECTION

PATENT NO : 5,176,949
DATED : January 5, 1993
INVENTOR(S): Allagnat, et al.

It is certified that error appears in the above-identified patent and that said Letters Patent is hereby corrected as shown below:

| COLUMN | LINE | |
|---|---|---|
| 9 (Claim 1, line 4) | 8 | "hog-melt" should read --hot-melt-- |

Signed and Sealed this

Twenty-ninth Day of May, 2001

Attest:

NICHOLAS P. GODICI

Attesting Officer

Acting Director of the United States Patent and Trademark Office